United States Patent
Kotrla

(10) Patent No.: US 10,239,562 B2
(45) Date of Patent: Mar. 26, 2019

(54) VEHICLE

(71) Applicant: Yamaha Hatsudoki Kabushiki Kaisha, Shizuoka-ken (JP)

(72) Inventor: Keith Kotrla, Newnan, GA (US)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 15/862,592

(22) Filed: Jan. 4, 2018

(65) Prior Publication Data

US 2018/0194404 A1    Jul. 12, 2018

Related U.S. Application Data

(60) Provisional application No. 62/444,311, filed on Jan. 9, 2017.

(51) Int. Cl.

| | |
|---|---|
| *B62D 23/00* | (2006.01) |
| *B62D 27/02* | (2006.01) |
| *B62D 25/06* | (2006.01) |
| *B60N 2/015* | (2006.01) |
| *B60J 5/04* | (2006.01) |
| *B62D 25/02* | (2006.01) |
| *B62D 27/06* | (2006.01) |
| *B60N 2/24* | (2006.01) |

(52) U.S. Cl.
CPC .......... *B62D 23/005* (2013.01); *B60J 5/0477* (2013.01); *B60J 5/0486* (2013.01); *B60N 2/015* (2013.01); *B60N 2/24* (2013.01); *B62D 25/02* (2013.01); *B62D 25/06* (2013.01); *B62D 27/023* (2013.01); *B62D 27/06* (2013.01)

(58) Field of Classification Search
CPC ...... B62D 23/005; B62D 25/02; B62D 25/06; B62D 27/023; B62D 27/06; B60J 5/0477; B60J 5/0486; B60N 2/015; B60N 2/24
USPC ........................................ 296/146.11, 146.12
See application file for complete search history.

(56) References Cited

U.S. PATENT DOCUMENTS

| | | | |
|---|---|---|---|
| 8,752,879 B1 * | 6/2014 | Heit ......................... | B60P 3/423 296/39.1 |
| 9,327,621 B2 * | 5/2016 | Oshima ................. | B60N 2/3013 |
| 2014/0217774 A1 * | 8/2014 | Peterson ................... | E05D 3/02 296/146.11 |

OTHER PUBLICATIONS

"Engineered Parts Accessories & Apparel 2015", retrieved on Dec. 26, 2016,<http://cdn.polarisindustries.com/polaris/vic/2015/polaris/brochures/Ranger%20section_2015.pdf>.

(Continued)

*Primary Examiner* — Joseph D. Pape
(74) *Attorney, Agent, or Firm* — HEA Law PLLC

(57) ABSTRACT

A vehicle with a passenger area having a seat disposed therein and an opening of the passenger area on the right or left sides of the seat. The vehicle frame includes an opening frame portion defining the opening of the passenger area. The opening frame portion comprises a lower attachment portion for attaching a hinge of a first door to the opening frame portion, and an upper attachment portion for attaching a hinge of a second door to the opening frame portion. The lower attachment portion and the upper attachment portion are portions formed by at least one of machining and welding. The lower attachment portion is formed in the main body frame of the vehicle frame, and the upper attachment portion is formed in the case of the vehicle frame.

15 Claims, 7 Drawing Sheets

(56) References Cited

OTHER PUBLICATIONS

"Development of the PIONEER 1000", Honda R&D Technical Review, retrieved on Dec. 26, 2016, <https://www.hondarandd.jp/point.php?pid=1211&lang=en>.

* cited by examiner

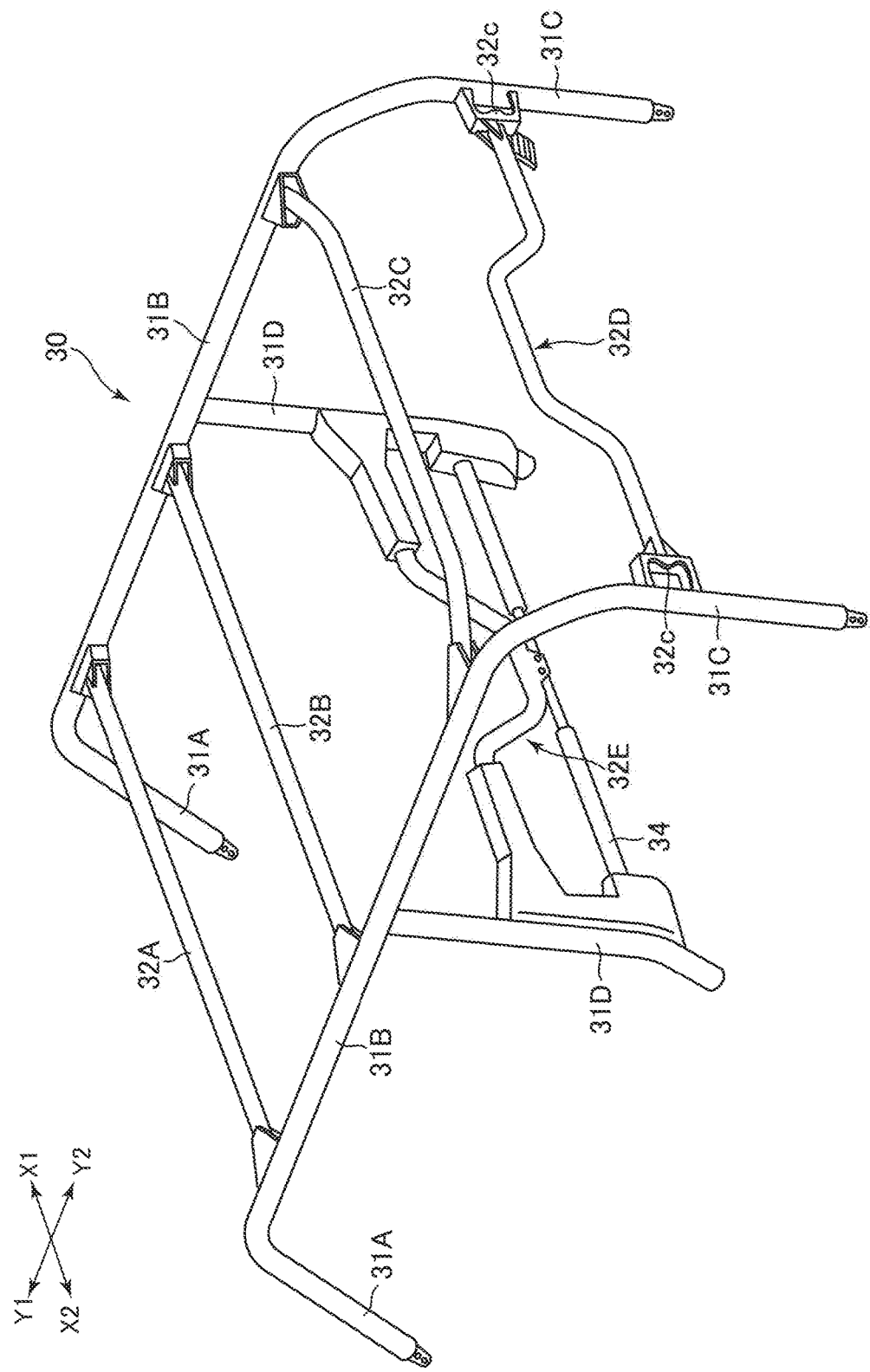

VEHICLE

CROSS-REFERENCE TO RELATED APPLICATION

The present application claims priority from U.S. provisional patent application 62/444,311 filed on Jan. 9, 2017, the content of which is hereby incorporated by reference into this application.

FIELD OF THE INVENTION

The present specification relates to technologies of four-wheel vehicles.

BACKGROUND OF THE INVENTION

Vehicles frequently used in rough terrain sometimes have different, sized doors taking into account, for example, the intended environment to use the vehicle and the appearance of the vehicle. For example, in vehicles used in cold regions, doors (hereinafter referred to as a "full-size door") covering the entirety of the openings on the right and left sides of the seats (an opening defined by the vehicle frame), are sometimes attached to the vehicle frame through hinges. (For example, please see Non-Patent Document 1 described below). On the other hand, in vehicles used in warm regions, doors (hereinafter referred to as a "half-size doors") covering only the lower half of the openings on the right and left sides of the seats, are attached to the vehicle frame through hinges. (For example, please see Non-Patent Documents 1 and 2 described below).

[Non-Patent Document 1] "Engineered Parts Accessories & Apparel 2015", retrieved on Dec. 26, 2016, <http://cdn.polarisindustries.com/polaris/vic/2015/polaris/brochures/Ranger%20section_2015.pdf>

[Non-Patent Document 2] "Development of the PIONEER 1000"/ Honda R&D Technical Review, retrieved on Dec. 26, 2016, <https://www.hondarandd.jp/point.php/48 pid=1211&lang=en>

SUMMARY OF THE INVENTION

An embodiment, of vehicle has right and left front wheels; right and left rear wheels; a passenger area, having a seat; an opening of the passenger area, located on a right side or a left side of the seat, an inner area of the opening, not being partitioned by a member extending from a lower end of the opening to an upper end of the opening; and a vehicle frame.

The vehicle frame has a main body frame supporting the seat, the right and left front wheels, and the right and left rear wheels; a cage formed separately from the main body frame and jointed to the main body frame to cover the seat in a side view of a vehicle body; and an opening frame portion formed by the main body frame and the cage and defining the opening of the passenger area. The opening frame portion has a lower attachment portion for attaching a hinge of a first door to the opening frame portion, the lower attachment portion being a portion formed by at least one of machining and welding; and an upper attachment portion for attaching a hinge of a second door to the opening frame portion, the upper attachment portion being a portion formed by at least one of machining and welding.

The lower attachment portion is formed on the main body frame, and the upper attachment portion is formed on the cage.

In this embodiment, no door is attached to the vehicle body. That is, a door is not an element of the embodiment.

In the embodiment described above, one portion of the lower attachment portion and the upper attachment portion may be located on a front side of the opening of the passenger area in the side view of the vehicle, and the other portion of the lower attachment portion and the upper attachment portion may be located on a rear side of the opening of the passenger area in the side view of the vehicle.

In the embodiment described above, the lower attachment portion may be located on a front side of the opening of the passenger area in the side view of the vehicle, and the upper attachment portion may be located on a rear side of the opening of the passenger area in the side view of the vehicle.

In the embodiment described above, the opening frame portion may have a first vertical portion located on a front side of the opening of the passenger area in the side view of the vehicle, and a second vertical portion located on a rear side of the opening of the passenger area in the side view of the vehicle. The first vertical portion may comprise an upper portion and a lower portion that is located further forward than the upper portion. The lower attachment portion may be formed on the lower portion of the first vertical portion, and the upper attachment portion may be formed on the second vertical portion.

In the embodiment described above, a distance in a front-rear direction between the first vertical portion and the lower portion of the second vertical portion may be larger than that between the first vertical portion and the upper portion of the second vertical portion. This embodiment can reduce the width of the vehicle body in the front-rear direction.

In the embodiment described above, the upper attachment portion may be located rearward of the seat in the side view of the vehicle or the upper attachment portion may overlap with the seat in the side view of the vehicle.

In the embodiment described above, a door may have a large enough size to close a lower region of the opening and not to close an upper region of the opening, and may be attached to the lower attachment portion.

In the embodiment described above, a door may have a large enough size to close both of a lower region and an upper region of the opening, and may be attached to the upper attachment portion.

In the embodiment described above, the seat may be a rear seat, and a front seat may be located forward of the rear seat.

Another embodiment of vehicle has right and left front wheels; right and left rear wheels; a passenger area having a seat; an opening of the passenger area located on a right side or a left side of the seat, an inner area of the opening not being partitioned by a member extending from a lower end of the opening to an upper end of the opening; and a vehicle frame.

The vehicle frame has a main body frame: supporting the seat, the right and left front wheels, and the right and left rear wheels; a cage formed separately from the main body frame and jointed to the main body frame to cover the seat in a side view of a vehicle body; and an opening frame portion formed by the main body frame and the cage and defining the opening of the passenger area.

The opening frame portion has a lower attachment portion for attaching a hinge of a first door to the opening frame portion, the lower attachment portion being a portion formed by at least one of machining and welding, the lower attachment portion being located lower than a center of the opening in a vertical direction; and an upper attachment portion for attaching a hinge of a second door to the opening frame portion, the upper attachment portion being a portion formed by at least one of machining and welding, the upper attachment portion being located higher than the center of the opening in the vertical direction.

In this embodiment, so door is attached to the vehicle body. That is, a door is not an element of the embodiment.

In the embodiment described above, one portion of the lower attachment portion and the upper attachment portion may be located on a front side of the opening of the passenger area in the side view of the vehicle, and the other portion of the lower attachment portion and the upper attachment portion may be located on a rear side of the opening of the passenger area in the side view of the vehicle.

In the embodiment described above, the opening frame portion may comprise a first vertical portion located on a front side of the opening of the passenger area in the side view of the vehicle, and a second vertical portion located on a rear side of the opening of the passenger area in the side view of the vehicle. The first vertical portion may comprise an upper portion and a lower portion that is located further forward than the upper portion. The lower attachment portion may be formed on the lower portion of the first vertical portion, and the upper attachment portion may be formed on the second vertical portion.

Still another embodiment of vehicle has right and left front wheels; right and left rear wheels; a passenger area having a seat disposed therein; an opening of the passenger area located on a right side or a left side of the seat, an inner area of the opening not being partitioned by a member extending from a lower end of the opening to an upper end of the opening; and a vehicle frame.

The vehicle frame has a main body frame supporting the seat, the right and left front wheels:, and the right and left rear wheels; a cage formed separately from the main foody frame and jointed to the main body frame to cover the seat in a side view of a vehicle body; and an opening frame portion formed by the main body frame and the cage and defining the opening of the passenger area.

The opening frame portion has
a lower attachment portion for attaching a hinge of a first door to the opening frame portion, the lower attachment portion, being a portion formed by at least one of machining and welding, and an upper attachment portion for attaching, to the opening frame portion, a hinge of a second door that has a larger width in a vertical direction than that of the first door, the upper attachment portion being a portion formed by at least one of machining and welding.

In this embodiment, no door is attached to the vehicle body. That is, a door is not an element the embodiment.

In the embodiment described above, one portion of the lower attachment portion and the upper attachment portion may be located on a front side of the opening of the passenger area in the side view of the vehicle, and the other portion of the lower attachment portion and the upper attachment portion may be located on a rear side of the opening of the passenger area in the side view of the vehicle.

In the embodiment described above, the opening frame portion may have a first vertical portion located on a front side of the opening of the passenger area in the side view of the vehicle, and a second vertical portion located on a rear side of the opening of the passenger area in the side view of the vehicle. The first vertical portion may have an upper portion and a lower portion that is located further forward than the upper portion. The lower attachment portion may be formed on the lower portion of the first vertical portion, and the upper attachment. portion may be formed on the second vertical portion.

BRIEF DESCRIPTION OF THE DRAWINGS

The following drawings illustrate examples of various components of the invention disclosed herein, and are for illustrative purposes only.

FIG. 3B is a perspective view of a cage forming the upper part of the vehicle frame.

DETAILED DESCRIPTION OF THE INVENTION

While the present invention may be embodied in many different forms, several illustrative embodiments are described herein with the understanding that this disclosure is to be considered as providing examples of the principles of the invention and such examples are not intended to limit the invention to the preferred embodiments described herein and/or illustrated herein.

Hereinafter, embodiments according to the present invention will be described. The embodiments disclosed in the present specification should be understood as an example of the invention and the invention is not limited to embodiments described in the following description and in the figures. Other embodiments having advantages that is: the same as, or similar to, advantages of the present embodiments are included within the scope of the present invention.

Various techniques and structures are described in this specification. Those may be combined with other techniques and structures described herein. Though the present specification does not describe all possible combinations, any combinations are within the scope of the present invention.

Unless otherwise defined, all terms used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. The terminology used herein is for the purpose of describing particular preferred embodiments only and is not intended to be limiting of the present invention. As used herein, the term "and/or" includes any and all combinations of one or more of the associated listed items, As used herein, the singular forms "a," "an," and "the" are intended to include the plural forms as well as the singular forms, unless the context clearly indicates otherwise. It will be further understood that the terms "comprises" "comprising" "includes" and "including" when used in this specification, specify the presence of stated features, operations, elements, and/or components, but do not preclude the presence or addition of one or more other features, operations, elements, components, and/or groups thereof.

Figure 1:
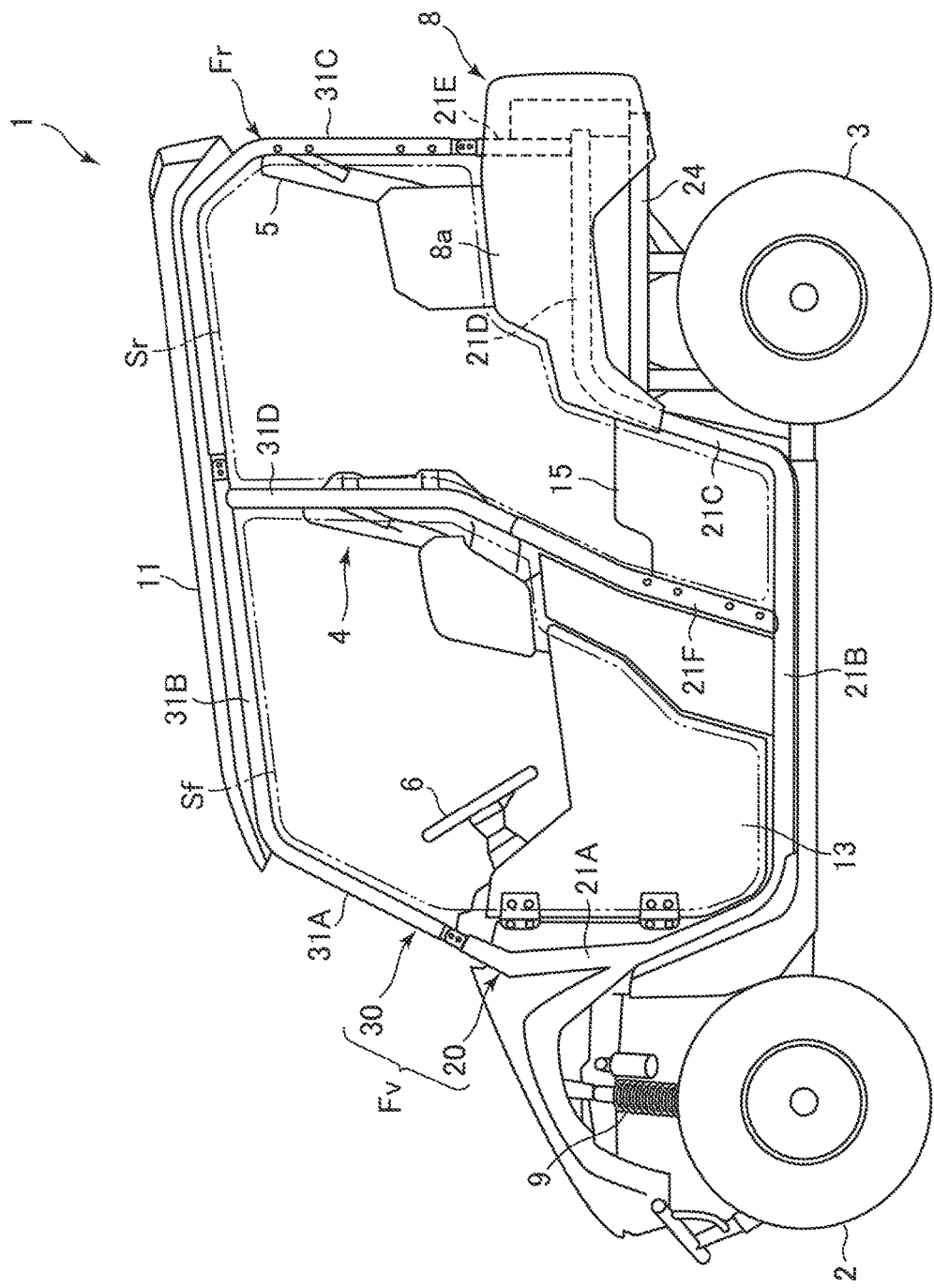
FIG. 1 is a side view of a vehicle which is an example of an embodiment according to an embodiment of the present invention.
Figure 4:
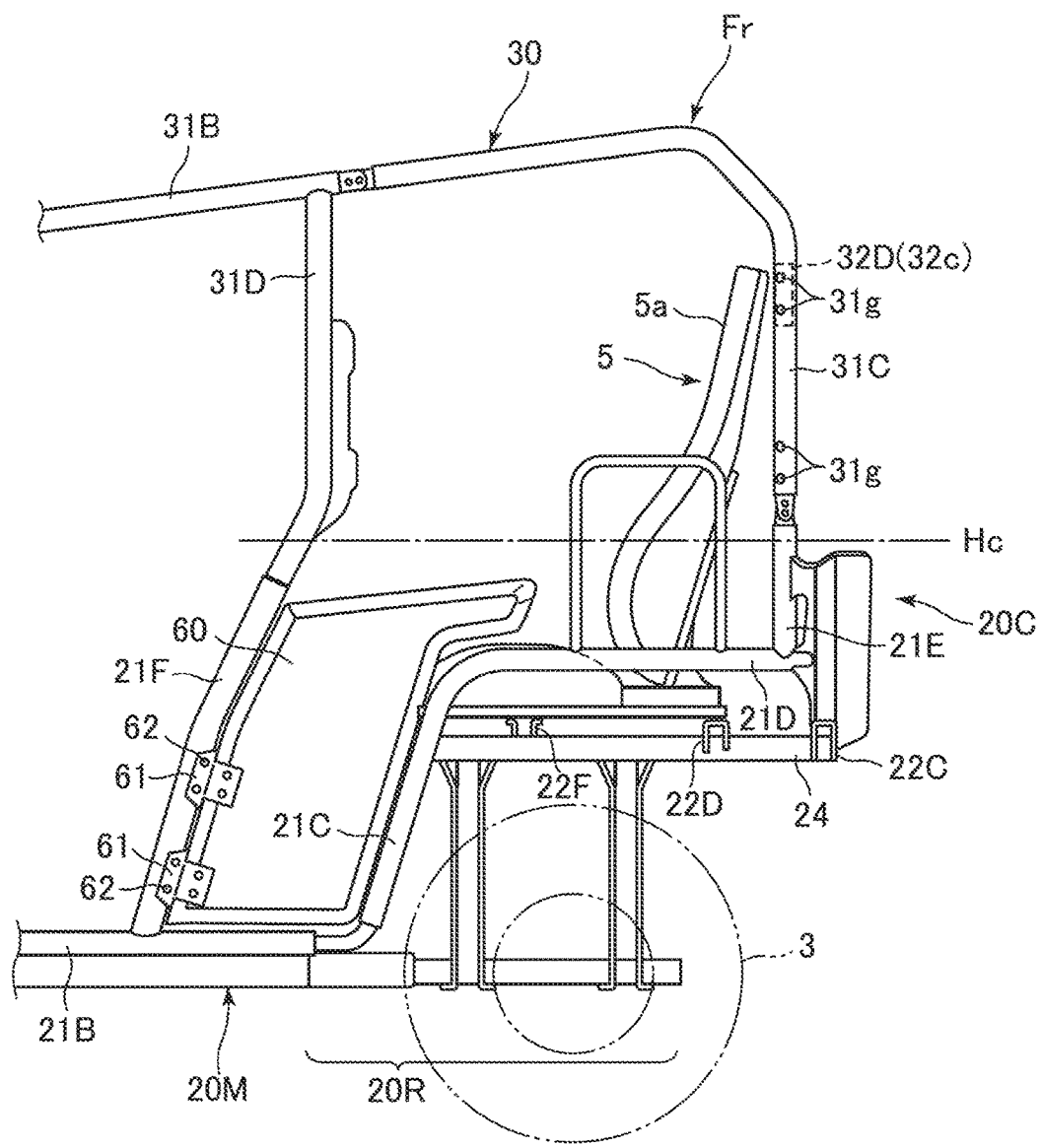
FIG. 4 is a side view of the vehicle frame with a half-size door attached to lower attachment portions shown in FIG. 2B.
Figure 5:
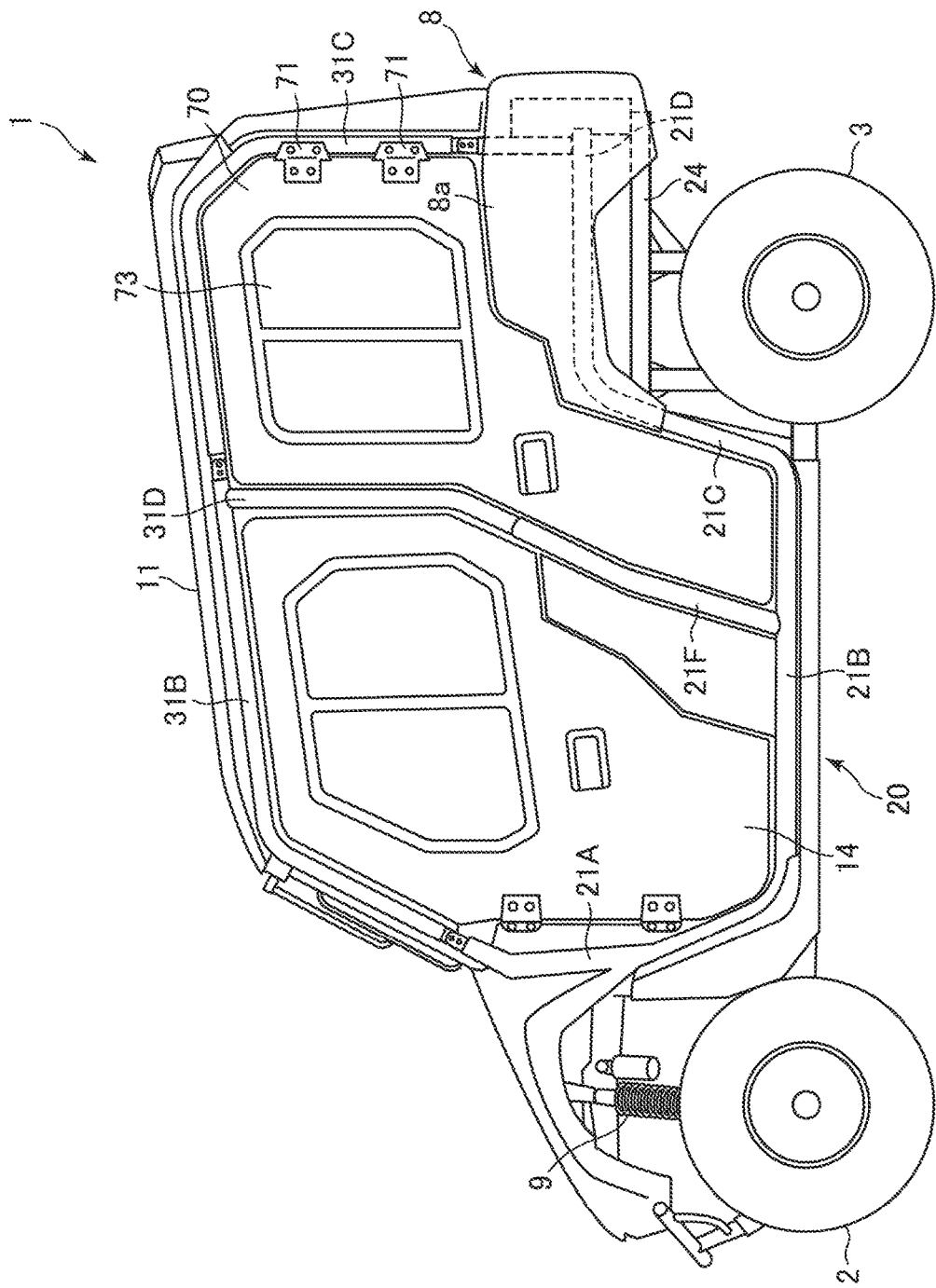
FIG. 5 is a side view of the vehicle in which a fall-size door is attached to the upper attachment portions shown in FIG. 4.

FIG. 1 is a side view of a vehicle 1 which is an example of the embodiments according to the present invention. In the vehicle 1 shown in this figure, no door is disposed on the right side and the left side of the rear seats 5. As shown in FIG. 4, a door 60 can be mounted on each of the right, side and the left side of the rear seats 5. As shown in FIG. 5, a door 70 having a vertical width larger than that of the door 60 can be mounted on each of the right side and the left side of the rear seats 5. In this specification, the door 60 will be referred to as a "half-size door" and the door 70 will be referred to as a "full-size door". As described above, the vehicle 1 can be in three states in which no door is mounted on the right side and the left side of the rear seats (FIG. 1), in which the half-size doors 60 are mounted thereon (FIG. 4), or the full-size doors 70 mounted thereon (FIG. 5).

Figure 2A:
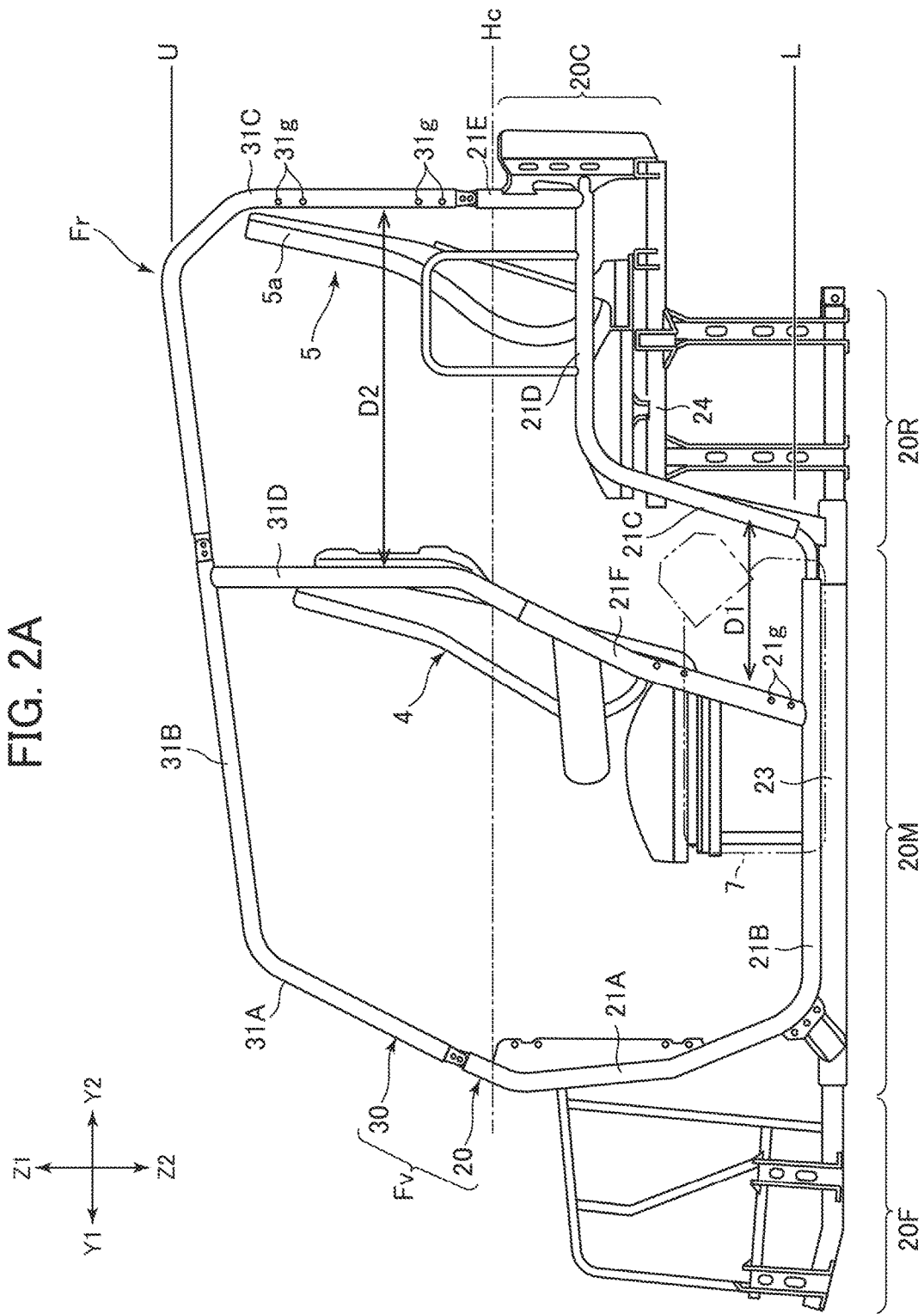
FIG. 2A is a side view of the vehicle frame.
Figure 2B:
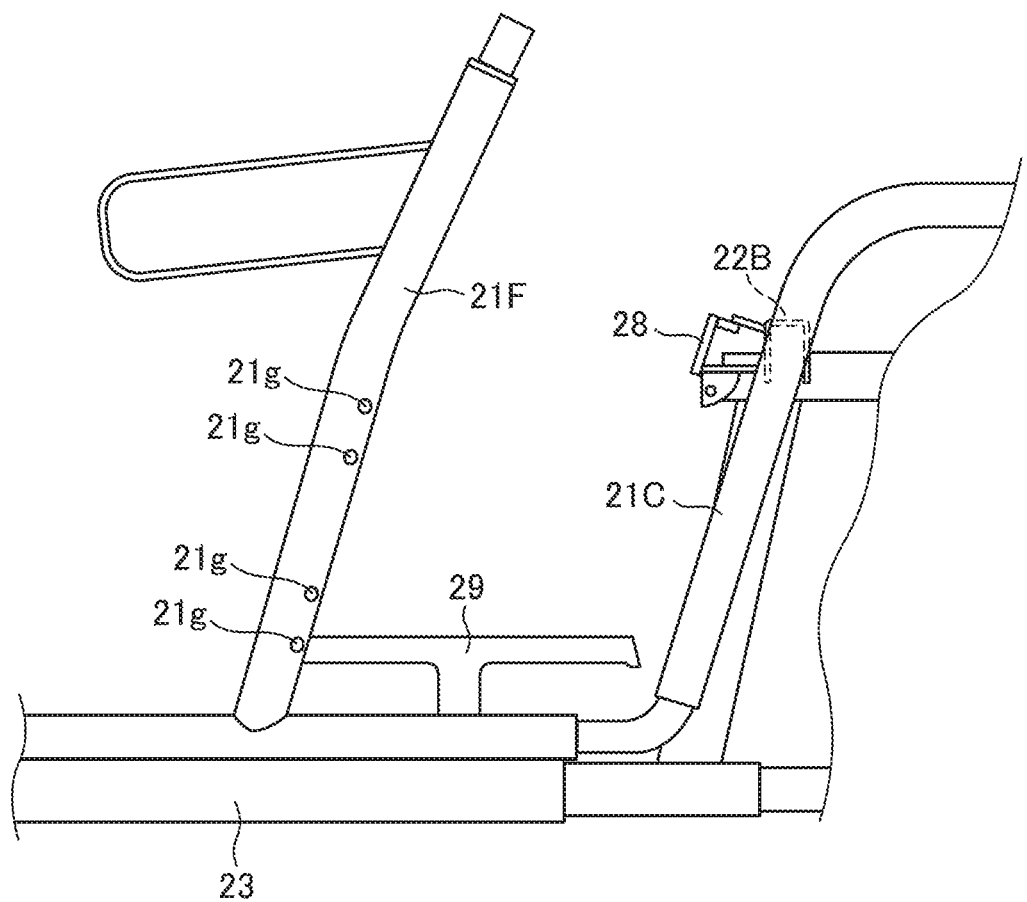
FIG. 2B is a side view showing a part of a main body frame forming the lower part of the vehicle frame.
Figure 3A:
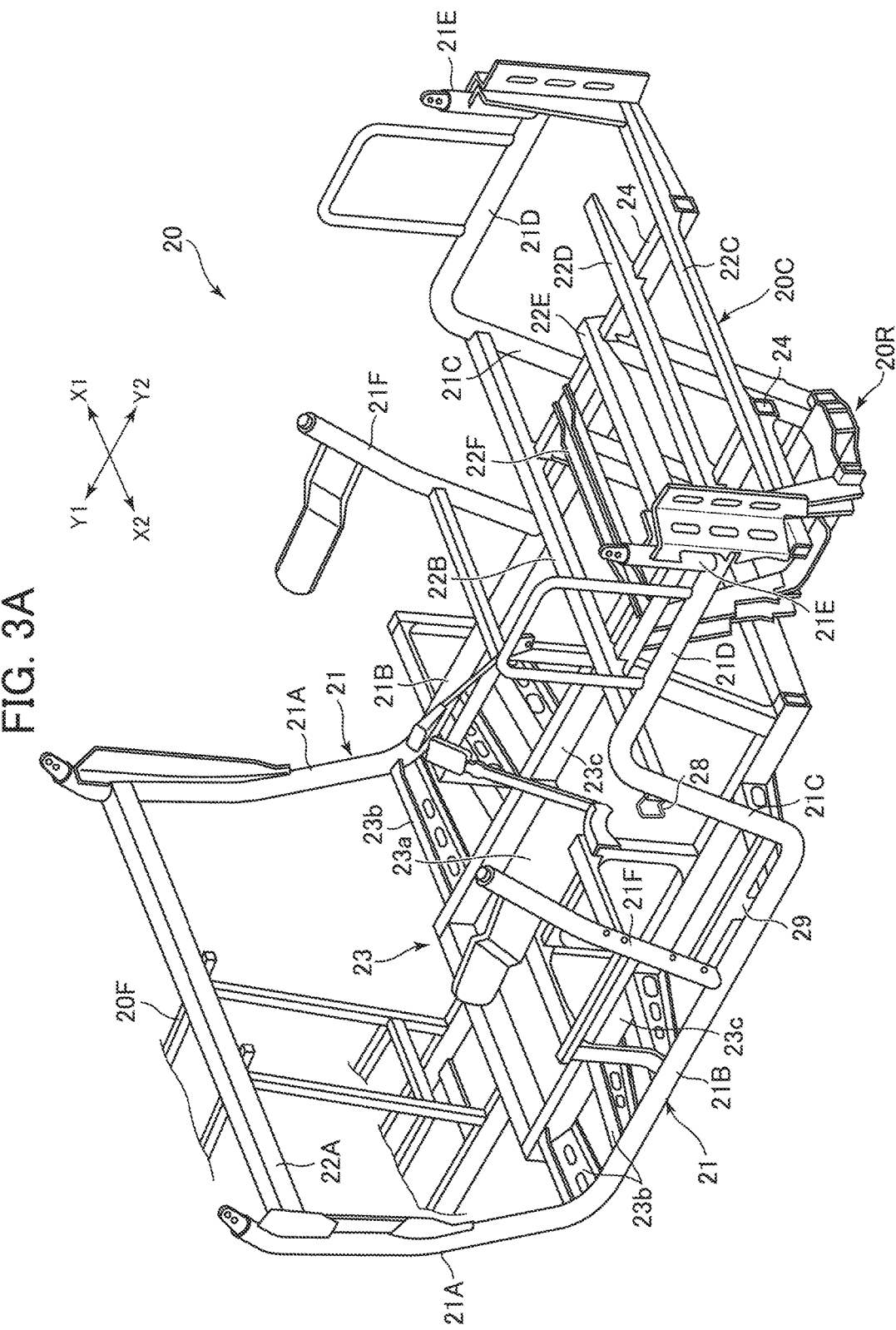
FIG. 3A is a perspective view of the main body frame forming the lower part of the vehicle frame.

FIG. 2A is a side view of a vehicle frame Fv of the vehicle 1. FIG. 2B is a side view showing a part of a main body frame 20 that is a lower part of the vehicle frame Fv. FIG. 3A is a perspective view of the main body frame 20. FIG. 3B is a perspective view of a cage 30 that is an upper part of the vehicle frame Fv. FIG. 4 is a side view of the vehicle frame Fv with the half-size door 60 attached to the lower attachment portions 21g shown in FIG. 2B. FIG. 5 is a side view of the vehicle 1 with the full-size door 70 attached to the upper attachment portions 31g shown FIG. 4.

In the following description, directions indicated by Y1 and Y2 in those figures will be referred to as a "forward direction" and a "rearward, direction", respectively. Directions indicated by Z1 and Z2 are referred to as an "upward direction" and a "downward direction", respectively. Directions indicated by X1 and X2 are referred to as a "rightward direction" and a "leftward direction", respectively.

The vehicle 1 is a vehicle that is suitable for use on rough terrain and is refereed to as a "Side-by-Side vehicle", a "Utility vehicle", and a "Recreational Off-Highway vehicle". As shown in FIG. 3, the vehicle 1 includes right and left front wheels 2 and right and left rear wheels 3. The vehicle 1 has right and left front seats 4 and right and left rear seats 5 disposed behind the front seats 4. One front seat 4 (the front seat 4 on the left side) is the driver seat. A steering wheel 6 is disposed in front of the driver seat.

The vehicle 1 has the vehicle frame Fv. As shown in FIG. 2, the vehicle frame Fv has the main body frame 20 and the cage 30. The main body frame 20 is disposed under the seats 4 and 5 and supports the seats 4 and 5, the front wheels 2, the rear wheels 3, and the engine unit 7. The power of the engine unit 7 is transmitted to one or both of the front wheels 2 and the rear wheels 3 via a drive shaft (not shown). The cage 30 covers the seats 4 and 5 in s side view of the vehicle body. In the present specification, the description "the cage 30 covers the seats 4 and 5" means that at least a part of the cage 30 is located over the seats 4 and 5 in a side view. The cage 30 also may not overlap with the seats 4 and 5 in a plan view of the cage 30.

The main body frame 20 and the cage 30, in the example of the vehicle 1, are separately formed from each other and are joined together in the vertical direction by fasteners. That is, the main body frame 20 has a plurality of structural elements (for example, pipes) each formed of metal. The cage 30 has a plurality of structural elements (for example, pipes) formed of a metal separately from the structural elements of the main body frame 20. The structural elements of the main body frame 20 and the structural elements of the cage 30 are connected to each other by fasteners such as bolts and rivets.

As shown in FIG. 2A, the main body frame 20 includes a frame front portion 20F located between the right and left front wheels 2. The frame front portion 20F supports each front wheel 2 through a shock absorber 9 (see FIG. 1) and arms (not shown) extending in the right-left direction. Further, the main body frame 20 includes a frame rear portion 20R located between the right and left rear wheels 3. The frame rear portion 20R supports each rear wheel 3 through a shock absorber (not shown) and arms (not shown) extending in the right-left direction.

In the example of the vehicle 1, the rear seats 5 are disposed above the rear wheels 3 (see FIG. 4). Specifically, in the example of the vehicle 1, a cargo bed 8 (see FIG. 1) is disposed over the rear wheel 3, and rear seats 5 are disposed on the cargo bed 8. As shown in FIG. 2A, a cargo bed frame 20C that is a frame of the cargo bed 3 is located on the frame rear portion 20R. The layout of the rear seats 5, the cargo bed 8, the rear wheel 3 is not limited to the example of the vehicle 1. For example, the rear seats 5 may be located further forward than the rear wheels 3 and the cargo bed 8.

As shown in FIG. 2A, the main body frame 20 includes a frame middle portion 20M located between the frame front portion 20F and the frame rear portion 20R. In the example of the vehicle 1, the engine unit 7 and the front seat 4 are mounted on the frame middle portion 20M. The engine unit 7 is disposed, for example, between the right and left front seats 4 and located forward of the rear seats 5. The engine unit 7 is located under the central console 15 located, for example, in front of the rear seats 5. The arrangement of the engine unit 7 is not limited to the example of the vehicle 1, and may be changed.

As shown in FIG. 3A, in the example of the vehicle 1, the frame middle portion 20M includes extending portions 21 on the right and left sides of the vehicle. Each extending portion 21 includes a middle portion 21B disposed at the bottom of the frame middle portion 20M and extending in the front-rear direction, a front vertical portion 21A extending obliquely upward from the front portion of the middle portion 21B, and a rear vertical portion 21C extending obliquely upward from the rear portion of the middle portions 21B. Additionally, the extending portion 21 includes a rear extending portion 21D extending rearward from the top of the rear vertical portion 21C. The rear extending portion 21D forms a side wall 8a (see FIG. 1) of the cargo bed 8. The extending portion 21 includes a rear vertical portion 21E extending upwardly from the rear extending portion 21D. The extending portion 21 includes a middle vertical portion 21F extending upward from a mid portion of the middle portion 21B of the frame middle portion 20M. The middle vertical portion 21F is located forward of the rear vertical portion 21C and the rear seats 5, and is located rearward of the front vertical portion 21A. As will be described later, in the example of the vehicle 1, lower attachment portions 21g (see FIG. 2B) for attaching hinges 61 of the half-size door 60 is formed in the middle vertical portion 21F. A plurality of cross portions 22A, 22B, and 22C extend between, and connect to, the right and left extending portions 21.

The respective portions of the extending portion 21 are, for example, pipes, but are not limited thereto. The whole extending portions 21 may be an integrally formed member.

Alternatively, the extending portions 21 may be composed of a plurality of members (for example, pipes) connected to each other.

In the example of the vehicle 1, as shown in FIG. 3A, the frame middle portion 20M includes a bottom portion 23 between the right and left middle portions 21B. The bottom portion 23 includes a bottom panel 23a, members 23b joined to the bottom panel 23a and extending in the right-left direction, a member 23c joined to the bottom panel 23a and extending in the front-rear direction, and the like. The right and left middle portion 21B is fixed to the left edge and the right edge of the bottom portion 23, respectively. The engine unit 7 and the front seats 4 are supported by the bottom portion 23. The structure of the main body frame 20 and the shape of each portion are not limited to the example of the vehicle 1.

As described above, the cargo bed frame 20C forming the cargo bed 8 is disposed over the frame rear portion 20R. As shown in FIG. 3A, the cargo bed frame 20C includes: right and left floor support portions 24 extending in the front-rear direction; a plurality of floor cross portions 22D, 22E, and 22F extending in the right-left direction and fixed to the floor support portion 24. A panel forming a floor (bottom) of the cargo bed 8 is fixed to the upper side of the floor support portion 24 and the floor cross portions 22D, 22E, and 22F. In the example of the vehicle 1, the rear seats 5 are located on the bottom of the cargo bed 8. The rear seats 5 are supported by the cargo bed frame 20C. The arrangement of the rear seats 5 is not limited to the example of the vehicle 1. For example, the rear seats 5 may be disposed forward of the cargo bed frame 20C. In this case, the rear seats 5 may be supported by the frame middle portion 20M.

As shown in FIG. 3B, the cage 30 includes front vertical portions 31A on the right and left side thereof, upper extending portion 31B on the right and left side thereof, rear vertical portions 31C on the right and left side thereof, and middle vertical portions 31D on the right, and left side thereof. As shown in FIG. 2A, the front vertical portion 31A is located forward of the front seats 4 in a side view of the vehicle body and extends in the vertical direction. In the example of the vehicle 1, the front vertical portion 31A extends obliquely rearward and upward. The front vertical portion 31A is connected to the front vertical portion 21A of the main body frame 20 by fasteners such as bolts and rivets, for example. The upper extending portion 31B is located over the seat 4 and 5 in a side view of the vehicle body and extends in the front-rear direction. In a plan view of the vehicle body, the upper extending portion 31B may overlap with the seats 4 and 5 or alternatively may not overlap with the seats 4 and 5.

As shown in FIG. 2A, the rear vertical portion 31C extends downward from a rear portion of the upper extending portion 31B and is located behind the rear seats 5 in the side view of the vehicle body. Alternatively, the rear vertical portion 31C may overlap with the rear seats 5 in the side view of the vehicle body. In the example of the vehicle 1, the rear vertical portion 31C extends in a generally vertical direction. The rear vertical portion 31C may be inclined forwarder rearward. The rear vertical portion 31C is connected to the rear vertical portion 21E of the cargo bed frame 20C by fasteners such as bolts and rivets, for example. As will be described in detail later, upper attachment portions 31g (see FIG. 4) for attaching the hinges 71 of the full-size door 70 (see FIG. 5) are formed in the rear vertical portion 31C of the cage 30 in the example of the vehicle 1.

As shown in FIG. 2A, the middle vertical portion 31D extends downward from the middle of the upper extending portion 31B and is located between the front vertical portion 31A and the rear vertical portion 31C in a side view of the vehicle body. The middle vertical portion 31D is located forward of the rear seat 5. The middle vertical portion 31D in the example of the vehicle 1 overlaps with the front seats 4 in a side view of the vehicle body (see FIG. 1). The middle vertical portion 31D may be located behind the front seat 4 in a side view of the vehicle body. The middle vertical portion 31D is connected to the middle vertical portion 21F of the main body frame 20 by fasteners such as bolts or rivets, for example.

As shown in FIG. 3B, the cage 30 further includes a plurality of cross portions 32A to 32E extending in the right-left direction, connecting the right and left extending portions 31B to each other, and connecting the right and left vertical portions 31A, 31C, and 31D. In the example of the vehicle 1, three cross portions 32A, 32B, and 32C extends between, and is connected to, the upper extending portions 31B on the right and left sides thereof. The cross portion 32D extends between, and is connected to, the rear vertical portions 31C on the right and left sides. The cross portion 32E extends between, and is connected to, the middle vertical portions 31D on the right and left sides. A grab bar 34 is located below the cross portion 32E and extends between, and is connected to, the middle vertical portions 31D on the right and left sides.

As shown in FIG. 1, a roof 11 covers the seats 4 and 5 and is attached to the cage 30. The roof 11 is attached to, for example, the right and left upper extending portions 31B and the cross portions 32A, 32B, and 32C connected to the upper extending portions 31B. The roof 11 is made of resin, for example.

In the example of the vehicle 1, the cross portions 32A to 32E are connected to the extending portion 31B and the vertical portions 31A, 31C and 31D by fixing means such as welding or bolts, for example. The connection structure of portions of the cage 30 may be changed. For example, the right and left front vertical portions 31A and the front cross portion 32A may be integrally formed to be a pipe like member. The right and left middle vertical portion 31D and the middle cross portion 32B may be integrally formed to be a pipe like member. The right and left rear vertical portions 31C and the rear cross portion 32C may be integrally formed to be a pipe like member.

The seats 4 and 5 are located in the passenger area. The passenger area is a space for passengers sitting on the seats 4 and 5. The passenger area is defined by a floor panel (not shown), which is attached to the bottom of the main body frame 20 to form the floor of the passenger area, the cage 30, and the roof 11 attached to the cage 30.

As shown in FIG. 1, openings Sr of the passenger area are formed on the right side and the left side of the rear seats 5. Hereinafter, this opening Sr is referred to as "rear opening". A passenger can get in, and get off, the rear seat 5 through the rear opening Sr. The rear opening Sr has three states which includes: a first state in which no door is mounted to the rear opening Sr (FIG. 1), a second state in which a half-size door 60 is mounted thereto (FIG. 4), and a third state in which a full-size door 70 mounted thereto in place of the half-size door 60. Both the half-size door 60 and the full-size door 70 may not be provided in the rear opening Sr.

The vehicle frame Fv includes an opening frame portion Fr (see FIG. 1). The opening frame portion Fr surrounds the rear opening Sr of the passenger area in a side view of the vehicle body. That is, the opening frame portion Fr defines the rear opening Sr. The opening frame portion Fr is formed by portions of the main body frame 20 and the cage 30, As shown in FIG. 2A, the front portion of the opening frame portion Fr is formed by the middle vertical portion 21F of the main body frame 20 and the middle vertical portion 31D of the cage 30. The rear portion of the opening frame portion Fr is formed by the rear vertical portion 31C of the cage 30, the rear vertical portion 21C and 21E of the main body frame 20, and the rear extending portion 21D of the main body frame 20. The lower portion of the opening frame portion Fr is formed by the middle portion 21B of the main body frame 20. The upper portion of the opening frame portion Fr is formed by the upper extending portion 31B of the cage 30.

As shown in FIG. 1, openings Sf of the passenger area are also formed on the right side and the left side of the front seats 4. Hereinafter, this opening Sf will be referred to as "front opening". The passenger can get in, and get off, the front seat 4 through the front opening Sf.

In this specification, the rear opening Sr is defined as an opening that is formed on the right side or the left side of the rear seats 5 and does not include the front opening Sf formed on the right side or the left side of the front seat 4. Therefore, the inside of the rear opening Sr has no member extending from the upper end (the upper extending portion 31B of the cage 30) to the lower end (the middle portion 21B of the main body frame 20) and partitioning the rear opening Sr. That is, the width of the rear opening Sr in the front-rear direction corresponds to the distance between the middle vertical portions 31D and 21F and the rear vertical portions 31C, 21C and 21E. Likewise, the inside of the front opening Sf has no member extending from the upper end (the upper extending portion 31B of the cage 30) to the lower end (the middle portion 21B of the main body frame 20) and partitioning the front opening Sf. That is, the width of the front Sr in the front-rear direction corresponds to the distance between the front vertical portion 31A and 21A and the middle vertical portion 31D and 21F. In a side view of the vehicle body, the rear opening Sr and the front opening Sf are partitioned by the middle vertical portions 31D and 21F.

As described above, the vehicle 1 has three states which includes: the first state in which no door is mounted to the right and left sides of the rear seat 5 (FIG. 1), the second state in which the half-size door 60 is mounted thereto (FIG. 4), and the third state in which the full-size door 70 mounted thereto. As shown in FIG. 4, in the example of the vehicle 1, the half-size door 60 closes only the lower region of the rear opening Sr. The half-size door 60 in the example of the vehicle 1 closes the space between the middle vertical portion 21F of the main body frame 20 and the rear vertical portion 21C of the main body frame 20. The half-size door 60 has a size that opens the upper region of the rear opening Sr. The half-size door 60 closes only the lower half of the rear opening Sr.

As shown in FIG. 1, when the half-size door 60 is used, a half-size door 13 is also provided in the front opening Sf formed on the right side and the left side of the front seats 4. The half-size door 13 has a size that closes only the lower region of the front opening Sf and opens the upper region of the front opening Sf.

The width in the vertical direction of the full-size door 70 is larger than the width in the vertical direction of the half-size door 60. The full-size door 70 closes both the lower region and the upper region of the rear opening Sr. As shown in FIG. 5, in the example of the vehicle 1, the width in the vertical direction of the full-size door 70 corresponds to the distance between the upper extending portion 31B of the cage 30 and the middle portion 21B of the main body frame 20. The full-size door 70 has a size that closes substantially the entire rear opening Sr. In detail, the full-size door 70 closes the space between the middle vertical portion 21F and the rear vertical portion 21C of the main body frame 20 and the space between the middle vertical portion 31D and the rear vertical portion 31C of the cage 30. The full-size door 70 may include a window 73 as shown in FIG. 5.

As shown in FIG. 5, when the full-size door 70 is used in the rear opening Sr, a full-size door 14 may also be used in the front opening Sf formed on the right side and the left side of the front seat 4. The full-size door 14 has a size that closes the upper region and the lower region of the front opening Sf. In other words, the full-size door 14 has a size corresponding to the front opening Sf.

As shown in FIG. 2B, a lower attachment portion 21g for attaching the hinge 61 (see FIG. 4) of the half-size door 60 is formed in the opening frame portion Fr of the vehicle frame Fv. The hinge 61 is attached to the lower attachment portion 21g and the half-size door 60 to support the half-size door 60 so that the door can open and close. As shown in FIG. 4, the opening frame portion Fr of the vehicle frame Fv includes an upper attachment portion 31g for attaching the hinge 71 (see FIG. 5) of the full-size door 70. The hinge 71 is attached to the upper attachment portion 31g and the full-size door 70 to support the full-size door 70 so that the door can open and close. The upper attachment portion 31g is located higher than the lower attachment portion 21g. Both attachment portions 21g and 31g are formed in the opening frame portion Fr in advance. That is, in a state where no door is mounted to the opening frame portion Fr the opening frame portion Fr includes the attachment portions 21g and 31g.

When a door is attached to the opening frame portion Fr, the door hinge is attached only to one attachment portion of the two attachment portions 21g and 31g and no door hinge is attached to the other attachment portion. For example, as shown in FIG. 4, in the vehicle 1 including the half-size door 60, the hinge 61 is attached to the lower attachment portion 21g. No hinge is attached to upper attachment portion 31g. In this case, the upper attachment portion 31g may be exposed or may be covered with another member. As shown in FIG. 5, in the vehicle 1 including the full-size door 70, the hinge 71 is attached to the upper attachment portion 31g and no hinge is attached to the lower attachment portion 21g. In this case, the lower attachment portion 21g may be exposed or may be covered with another member.

The lower attachment portion 21g is a portion that has been subjected to machining and/or welding so that the hinge 61 of the half-size door 60 is allowed to be attached to the opening frame portion Fr. That is, the lower attachment portion 21g is a hole or a groove formed on the opening frame portion Fr or a member attached on the opening frame portion Fr so that the hinge 61 of the half-size door 60 is allowed to be attached to the opening frame portion Fr. In the example of the vehicle 1, the hinge 61 is fixed to the opening frame portion Fr (the middle vertical portion 21F in the example of the vehicle 1) with a screw 62 (see FIG. 4). Therefore, the lower attachment portion 21g is a hole formed by machining so that the screw 62 can be inserted thereinto. The means for fixing the hinge 61 to the opening frame portion Fr is not limited to the screw. For example, a nut may be fixed as the lower attachment portion 21g to the opening frame portion Fr. The nut is fixed to the opening frame portion Fr by welding, for example. The lower attachment portion 21g is not limited to the hole and the nut. For example, a groove into which the hinge 61 is inserted and which has the hinge 61 fixed thereto may be formed in the opening frame portion Fr as the lower attachment portion 21g. The groove is formed by machining. Also, a bracket that is connectable to the hinge 61 may be provided in the opening frame portion Fr as the lower attachment portion 21g. Such a bracket may be fixed to the opening frame portion Fr by welding.

The upper attachment portion 31g is a portion that has been subjected to machining and/or welding so that the hinge 71 of the full-size door 70 is allowed to be attached to the opening frame portion Fr. That is, the upper attachment portion 31g is a hole or a groove formed on the opening frame portion Fr or a member attached on the opening frame portion Fr so that the hinge 71 of the full-size door 70 is allowed to be attached to the opening frame portion Fr. In the example of the vehicle 1, the hinge 71 is fixed to the opening frame portion Fr (the rear vertical portion 31c of the cage 30 in the example of the vehicle 1) with screws. Therefore, the upper attachment portion 31g is a hole formed by machining so that a screw can be inserted thereto. The means for fixing the hinge 71 to the opening frame portion Fr is not limited to a screw. For example, a nut may be fixed as the upper attachment portion 31g to the opening frame portion Fr. Such a nut is fixed to the opening frame portion Fr by welding, for example. The upper attachment portion 31g is not limited to a hole and a nut. For example, a groove into which the hinge 71 is inserted and which has the hinge 61 fixed thereto may be formed in the opening frame portion Fr as the upper attachment portion 31g. This groove may be formed by machining. Also, a bracket that is connectable to the hinge 71 may be provided in the opening frame portion Fr as the upper attachment portion 31g. Such a bracket may be fixed to the opening frame portion Fr by welding.

In the example of the vehicle 1, a plurality of lower attachment portions 21g and a plurality of upper attachment portions 31g are formed in the opening frame portion Fr in advance. That is, in a state where no door is mounted to the opening frame portion Fr, a plurality of lower attachment portions 21g and a plurality of upper attachment portions 31g are formed in the opening frame portion Fr. As shown in FIG. 4, in the example of the vehicle 1, the half-size door 60 is fixed to the opening frame portion Fr by a plurality of hinges 61. Each hinge 61 is attached to the opening frame portion Fr by a plurality of screws 62. More specifically, the half-size door 60 is fixed to the opening frame portion Fr by two hinges 61. Each hinge 61 is attached to the opening frame portion Fr by two screws 62. Therefore, four holes (four lower attachment portions 21g) are formed in the opening frame portion Fr in advance. Similarly, in the example of the vehicle 1, the full-size door 70 is fixed to the opening frame portion Fr by a plurality of hinges 71. Each hinge 71 is attached to opening frame portion Fr by a plurality of screws. More specifically, the full-size door 70 is fixed to the opening frame portion Fr by two hinges 71. Each hinge 71 is attached to the opening frame portion Fr by two screws. Therefore, four holes (four upper attachment portions 31g) are formed in the opening frame portion Fr in advance.

The number of the hinges 61 and 71 and the number of the attaching portions 21g and 31g are not limited to the example of the vehicle 1. The half-size door 60 may be fixed to the opening frame portion Fr by one hinge 61 or three hinges 61. Likewise, the full-size door 70 may be fixed to the opening frame portion Fr by one hinge 71 or three hinges 71.

As shown in FIG. the lower attachment portion 21g is positioned lower than the center Hc of the rear opening Sr in the vertical direction. On the other hand, the upper attachment portion 31g is located higher than the center Hc of the rear opening Sr in the vertical direction. As shown in FIG. 2A, the center Hc has an intermediate height between the upper end U and the lower end L of the rear opening Sr.

As described above, in the example of the vehicle 1, a plurality of lower attachment portions 21g and a plurality of upper attachment portions 31g are formed in the opening frame portion Fr of the vehicle frame Fv. All the lower attachment portions 21g are located lower than the center Hc. All the upper attachment portions 31g are located higher than the center Hc. The positions of the attachment portions 21g and 31g are not limited to the example of the vehicle 1. For example, one or some of the lower attachment portions 21g may be located higher than the center Hc. Also, one or some of the plurality of upper attachment portions 31g may be positioned lower than the center Hc.

In the example of the vehicle 1, the lower attachment portion 21g for the half-size door 60 is formed in the main body frame 20. On the other hand, the upper attachment portion 31g for the full-size door 70 is formed in the cage 30. As described later, in the example of the vehicle 1, the lower attachment portion 21g is provided in the middle vertical portion 21F of the main body frame 20 and the upper attachment portion 31g is provided in the rear vertical portion 31C of the cage 30.

As described above, in the example of the vehicle 1, the plurality of lower attachment portions 21g and the plurality of upper attachment portions 31g are formed in the opening frame portion Fr of the vehicle frame Fv. All the lower attachment portions 21g are provided in the main body frame 20. This structure improves the positional accuracy of the plurality of the lower attachment portions 21g, compared with, for example, a structure in which one or some of the lower attachment portions 21g are provided in the main body frame 20 and the rest of the lower attachment portions 21g are provided in the cage 30. In the example of the vehicle 1, all the upper attachment portions 31g are provided in the cage 30. This structure improves the positional accuracy of the plurality of the upper attachment portions 31g, compared with, for example, a structure in which one or some of the upper attachment portions 31g are provided in the cage 30 and the rest of the upper attachment, portions 31g are provided in the main body frame 20. The positions of the attachment portions 21g and 31g are not limited to the example of the vehicle 1. For example, one or some of the plurality of lower attachment portions 21g may be provided in the cage 30. One or some of the plurality of upper attachment portions 31g may be provided in the main body frame 20.

As described above, the rear wheels 3 are disposed under the rear seats 5 in a side view. This arrangement of the rear seats 5 and the rear wheels 3 reduces the length in the front-rear direction, of the vehicle body, compared with the layout in which the rear wheels are disposed behind the rear seats, for example. In the example of the vehicle 1, as shown in FIG. 1, the rear seats 5 are mounted on a cargo bed 8 located over the rear wheels 3.

As shown in FIG. 1, the opening frame portion Fr of the vehicle frame Fv includes the middle vertical portions 21F and 31D that define the front edge of the rear opening Sr. In addition, the opening frame portion Fr includes rear vertical portions 21C, 21E, and 31C which are located away from the middle vertical portions 21F and 31D. The rear vertical portion 21C positioned lower than the rear vertical portions 21E and 31C is located forward of the rear wheels 3 in a side view of the vehicle body. A space is secured between the rear vertical portion 21C and the middle vertical portion 21F.

As shown in FIG. 2A, the rear vertical portions 21E and 31C are located further rearward than the rear vertical portion 21C. Similarly to the rear seats 5, the rear vertical portions 21E and 31C are located higher than the rear wheels 3. The rear vertical portions 31C of the cage 30 are located on the rear side of the rear seats 5 in a side view of the vehicle body. The cross portion 32D (see FIG. 3B) extends between, and is connected to, the right and left rear vertical portions 31C, and the rear vertical portions 31C are located on the rear side of the rear seats 5. This allows the cross portion 32D to support the rear side of the rear seats 5. For example, the cross portion 32D supports the rear seats 5 when a rearward force is applied to the rear seats to move the seats backward. When no force acts on the rear seats 5, the rear seats 5 and the cross portion 32D may be in contact with each other, or alternatively the rear seats 5 and the cross portions 32D may have a space between them.

Thus, in the example of the vehicle 1, the rear wheels 3 are disposed under the rear seats 5 in a side view. The rear vertical portions 21C of the main body frame 20 are located forward of the rear wheel 3. On the other hand, the rear vertical portions 31C and 21E are located higher than the rear vertical portion 21C and located on the rear side of the rear seats 5. As shown in FIG. 2A, the distance D2 in the front-rear direction between the middle vertical portion 31D and the rear vertical portions 21E and 31C is larger than the distance in the front-rear direction between the middle vertical portion 21F and the rear vertical portion 21C. Due to this arrangement of the rear seats 5 and the rear wheels 3, the lower region of the rear opening Sr is smaller in the width of the rear opening Sr in the front-rear direction than the upper region of the rear opening Sr.

As described above, the opening frame portion Fr includes the middle vertical portions 21F and 31D that defines the front edge of the rear opening Sr. As shown in FIG. 2A, the lower portions of the middle vertical portions 21F and 31D are located further forward than the upper portions thereof.

As shown in FIG. 2A, in the example of the vehicle 1, the middle vertical portion 21F of the main body frame 20 extends upward from the middle portion 21B and is inclined backward. The middle vertical portion 31D of the cage 30 extends substantially in the vertical direction from the upper end of the middle vertical portion 21F. The forms of the middle vertical portions 21F and 31D are not limited to the example of the vehicle 1. For example, the whole middle vertical portions 21F and 31D may be inclined rearward. In still another example, the middle vertical portion 21F of the main body frame 20 may be arranged in a generally vertical direction and the middle vertical portion 31D of the cage 30 may extend upwardly and rearwardly from the middle vertical portion 21F. In yet another example, the entire middle vertical portions 21F and 31D may be arranged in a generally vertical direction.

As shown in FIG. 1, in the example of the vehicle 1, the lower attachment portions 21g for the half-size door 60 are located on the front side of the rear opening Sr of the passenger area in a side view of the vehicle body. In other words, the lower attachment portions 21g are formed on a lower portion of the middle vertical portions 21F and 31D which define the front edge of the rear opening Sr. In the example of the vehicle 1, the lower attachment portions 21g are formed in the middle vertical portions 21F of the main body frames 20 (see FIG. 2B).

On the other hand, as shown in FIG. 1, the upper attachment portions 31g for the full-size door 70 are located on the rear side of the rear opening Sr of the passenger room in a side view of the vehicle body. In other words, the upper attachment portions 31g are formed in the rear vertical portions 21E and 31C which defines the rear edge of the rear opening Sr. In the example of the vehicle 1, the upper attachment portions 31g are formed in the rear vertical portion 31C of the cage 30. That is, the lower attachment portions 21g are formed on a front most member among the members of the opening frame portion Fr, and the upper attachment portions 31g are formed on a rearmost member among the members of the opening frame portion Fr. The full-size door 70 attached via the hinge 71 to the upper attachment portions 31g opens such that its distal edge moves outward, in the right-left direction.

In the example of the vehicle 1, the upper portion of the middle vertical portions 21F and 31D (more specifically, the middle vertical portion 31D of the cage 30) is located further rearward than the lower portion thereof. Therefore, the full-size door 70 opens more widely in the structure in which the upper attachment portions 31g are formed in the rear vertical portions 31C than in a structure in which the upper attachment portions 31g are formed on the upper portion of the middle vertical portions 21F and 31D.

In the example of the vehicle 1, the rear vertical portion 31C is located rearward of the seat back 5a of the rear seat 5 in a side view of the vehicle body. In other words, the upper attachment portion 31g is located rearward of the seat back 5a of the rear seat 5 in a side view of the vehicle body. Therefore, when the full-size door 70 is opened, the rear opening Sr, can open widely. The rear vertical portion 31C may overlap the seat back 5a of the rear seat 5 in a side view of the vehicle body. In other words, the -upper attachment portion 31g may overlap the seat back 5a of the rear seat 5 in a side view of the vehicle body.

As described above, the cross portion 32D (see FIG. 3B) extends between, and is connected to, the right and left rear vertical portions 31C of the cage 30. In the example of the vehicle 1, as shown in FIG. 4, the height of the end portion 32c of the cross portion 32D coincides with the height of the upper attachment portion 31g. In other words, in a side view of the vehicle body, the upper attachment portion 31g overlaps the cross portion 32D. In the example of the vehicle 1, the height of the attachment portion 31g for the upper hinge 71 of the two hinges 71 coincides with the height of the end portion 32c of the cross portion 32D. The relationship between the height of the upper attachment portion 31g and the height of the cross portion 32 D is not limited to the example of the vehicle 1. For example, the cross portion 32D may be located at a height between the plurality of hinges 71. That is, the cross portion 32D may be located at a height between the plurality of attachment portions 31g fixing the plurality of hinges 71, in other words, at a height between the upper two attachment portions 31g and the lower two attachment portions 31g. In yet another example, the cross portion 32D may be located at a height corresponding to the height of the lowermost hinge 71.

The positions of the upper attachment portions 31g and the lower attachment portions 21g are not limited to the example of the vehicle 1. For example, when the middle vertical portions 21F and 31D extend substantially in the vertical direction, both the upper attachment portion 31g and the lower attachment portion 21g may be formed in the middle vertical portions 21F and 31D. More specifically, the upper attachment portions 31g may be formed in the middle vertical portion 31D of the cage 30. In still another example, depending on the shape of the opening frame portion Fr, the upper attachment portions 31g may be formed in the middle vertical portions 21F and 31D and the lower attachment portions 21g may be formed in the rear vertical portions 31C and 21D.

The vehicle frame Fv is provided with a stopper portion 29 (see FIG. 2B) for defining the positions of the half-size door 60 and the full-size door 70 when the doors are closed. In the example of the vehicle 1, a common stopper portion 29 is used for the half-size door 60 and the full-size door 70.

More specifically, the stopper portion 29 is provided in the lower region of the rear opening Sr. That is, the stopper portion 29 is provided in a region of the half-size door 60. As shown in FIG. 2B, the stopper portion 29 is formed in the bottom portion 23 of the middle portion 20M of the main body frame 20, for example. The stopper portion 29 extends in the front-rear direction between the middle vertical portion 21F and the rear vertical portion 21C of the main body frame 20 in side view of the vehicle body. This structure enables the common stopper portion 29 to be used for the half-size door 60 and the full-size door 70. The position of the stopper portion 29 is not limited to the example of the vehicle 1. For example, a stopper for the half-size door 60 and another stopper for the full-size door 70 may be formed in the vehicle frame Fv.

The vehicle frame Fv has a locking portion 28 (see FIG. 2B) formed thereon for locking the positions of the half-size door 60 and the full-size door 70 when the doors are closed. In the example of the vehicle 1, a common locking unit 28 is used for both the half-size door 60 and the full-size door 70.

Specifically, the locking portion 28 is provided in a lower region of the rear opening Sr. That is, the locking portion 28 is provided in the region of the half-size door 60. As shown in FIG. 2B, the locking portion 28 is formed in a cross portion 22B (see FIG. 3A) extending between, and connected to, the right and left rear vertical portions 21C. This structure enables the common locking portion 28 to be used for the halt-size door 60 and the full-size door 70. When the doors 60 and 70 are closed, the locking portion 28 engages with a locked portion (not shown) formed in the doors 60 and 70 to lock their position.

The locking portion 28 is formed at a position that is distant in the front-rear direction from the position (the middle vertical portion 21F) of the lower attachment portion 21g for the half-size door 60 and from the position (the rear vertical portion 31C) of the upper attachment portion 31g for the full-size door 70. Accordingly, whichever doors are used, the half-size door 60 or the full-size door 70, the doors 60 and 70 can be properly locked. The position of the locking portion 28 is not limited to the example of the vehicle 1. For example, a locking portion for the half-size door 60 and another locking portion for the full-size door 70 may be formed in the vehicle frame Fv.

The present invention is not limited to the above-described embodiment, and various modifications are possible.

For example, in the example of the vehicle 1, the attachment portions 21g and 31g are used for mounting the doors 60 and 70 in the rear opening Sr formed on the right side and the left side of the rear seats 5. However, the attachment portions 21g and 31g may be used for mounting the doors 13 and 14 in the front opening Sf formed on the right side and the left side of the front seats 4. In this case, the lower attachment portion 21g may be formed in the main body frame 20 and the upper attachment portion 31g may be formed in the cage 30. For example, the lower attachment portion 21g may be formed in the front vertical portion 21A of the main body frame 20, and the upper attachment portion 31g may be formed in the front vertical portion 31A of the cage 30. In another example, the lower attachment portion 21g may be formed in the front vertical portion 21A of the main body frame 20, and the upper attachment portion 31g may be formed in the middle vertical portion 31D of the cage 30.

The attachment portions 21g and 31g for the doors 60 and 70 mounted on the left side of the vehicle body and the attachment portions 21g and 31g for the doors 60 and 70 mounted on the right side of the vehicle body may also not be symmetrical. For example, the upper attachment portion 31g on the left side of the vehicle body may be formed on the rear vertical portion 31C of the cage 30. The upper attachment portion 31g in the right side of the vehicle body may be formed in the middle vertical portion 31D of the cage 30.

The present invention is not limited to the above-described embodiment. It is obvious to those skilled in the art that there are other embodiments that can obtain similar functions and effects. Such substantially equivalent other embodiments are covered by the claims.

What is claimed is:

1. A vehicle comprising:
   a right front wheel and a left front wheel;
   a right rear wheel and a left rear wheel;
   a passenger area having a seat disposed therein;
   an opening of the passenger area, located on a right side or a left side of the seat,, wherein an inner area of the opening is not partitioned by a member extending from a lower end of the opening to an upper end of the opening; and
   a vehicle frame comprising
      a main body frame supporting the seat, the right front wheel, the left front wheel, the right rear wheel and the left rear wheel;
      a cage formed separately from the main body frame and joined to the main body frame to cover the seat in a side view of a vehicle body; and
      an opening frame portion which defines the opening of the passenger area and which is formed by the main body frame and the cage,
   wherein
   the opening frame portion comprises
      a lower attachment portion for attaching a hinge of a first door to the opening frame portion, the lower attachment portion being a portion formed by at least one of machining and welding, and
      an upper attachment portion for attaching a hinge of a second door to the opening frame portion, the upper attachment portion being a portion formed by at least one of machining end welding,
   the lower attachment portion is formed on the main body frame, and
   the upper attachment portion is formed on the cage.

2. The vehicle according to claim 1, wherein
   one portion of the lower attachment portion and the upper attachment portion is located on a front side of the opening of the passenger area in the side view of the vehicle, and
   the other portion of the lower attachment portion and the upper attachment portion is located on a rear side of the opening of the passenger area in the side view of the vehicle.

3. The vehicle according to claim 1, wherein
   the lower attachment portion is located on a front side of the opening of the passenger area in the side view of the vehicle, and
   the upper attachment portion is located on a rear side of the opening of the passenger area in the side view of the vehicle.

4. The vehicle according to claim 1, wherein
the opening frame portion comprises
- a first vertical portion located on a front side of the opening of the passenger area in the side view of the vehicle, and
- a second vertical portion located on a rear side of the opening of the passenger area in the side view of the vehicle, the first vertical portion comprises an upper portion and a lower portion, and the lower portion is located further forward than the upper portion,
the lower attachment portion is formed on the lower portion of the first vertical portion, and
the upper attachment portion is formed on the second vertical portion.

5. The vehicle according to claim 4, wherein
a distance in a front-rear direction between the first vertical portion and the lower portion of the second vertical portion is larger than that between the first vertical portion and the upper portion of the second vertical portion.

6. The vehicle according to claim 4, wherein
the upper attachment portion is located rearward of the seat in the side view of the vehicle or overlaps with the seat in the side view of the vehicle.

7. The vehicle according to claim 1, wherein
the first door is configured to close a lower region of the opening and to not close an upper region of the opening, and is attached to the lower attachment portion.

8. The vehicle according to claim 1, wherein
the first door is configured to close both a lower region and an upper region of the opening, and is attached to the upper attachment portion.

9. The vehicle according to claim 1, wherein
the seat is a rear seat, and
a front seat is located forward of the rear seat.

10. A vehicle comprising:
a right front wheel and a left front wheel;
a right rear wheel and a left rear wheel;
a passenger area having a seat disposed therein;
an opening of the passenger area located on a right side or a left side of the seat, wherein an inner area of the opening is not partitioned by a member extending from a lower end of the opening to an upper end of the opening; and
a vehicle frame comprising
- a main body frame supporting the seat, the right front wheel, the left front wheel, the right rear wheel and the left rear wheel;
- a cage formed separately from the main body frame and joined to the main body frame to cover the seat in a side view of a vehicle body; and
- an opening frame portion defining the opening of the passenger area, formed by the main body frame and the cage, wherein
the opening frame portion comprises
- a lower attachment portion for attaching a hinge of a first door to the opening frame portion, the lower attachment portion being a portion formed by at least one of machining and welding, the lower attachment portion being located lower than a center of the opening in a vertical direction, and
- an upper attachment portion for attaching a hinge of a second door to the opening frame portion, the upper attachment portion being a portion formed by at least one of machining and welding, the upper attachment portion being located higher than the center of the opening in the vertical direction.

11. The vehicle according to claim 10, wherein
one portion of the lower attachment portion and the upper attachment portion is located on a front side of the opening of the passenger area in the side view of the vehicle, and
the other portion of the lower attachment portion and the upper attachment portion is located on a rear side of the opening of the passenger area in the side view of the vehicle.

12. The vehicle according to claim 10, wherein
the opening frame portion comprises
- a first vertical portion located on a front side of the opening of the passenger area in. the side view of the vehicle, and
- a second vertical portion located on a rear side of the opening of the passenger area in the side view of the vehicle, the first vertical portion comprises an upper portion and a lower portion that is located further forward than the upper portion,
the lower attachment portion is formed on the lower portion of the first vertical portion, and
the upper attachment portion is formed on the second vertical portion.

13. A vehicle comprising:
a right front wheel and a left front wheel;
a right rear wheel and a left rear wheel;
a passenger area having a seat disposed therein;
an opening of the passenger area located on a right side or a left side of the seat, wherein an inner area of the opening is not partitioned by a member extending from a lower end of the opening to an upper end of the opening; and
a vehicle frame comprising
- a main body frame supporting the seat, the right front wheel, the left front wheel, the right rear wheel and the left rear wheel;
- a cage formed separately from the main body frame and joined to the main body frame to cover the seat in a side view of a vehicle body; and
- an opening frame portion formed by the main body frame and the cage and defining the opening of the passenger area, wherein
the opening frame portion comprises
- a lower attachment portion for attaching a hinge of a first door to the opening frame portion, the lower attachment portion being a portion formed by at least one of machining and welding, and
- an upper attachment portion for attaching, to the opening frame portion, a hinge of a second door that has a larger width in a vertical direction than that of the first door, the upper attachment portion being a portion formed by at least one of machining and welding.

14. The vehicle according to claim 13, wherein
one portion of the lower attachment portion and the upper attachment portion is located on a front side of the opening of the passenger area in the side view of the vehicle, and
the other portion of the lower attachment portion and the upper attachment portion is located on a rear side of the opening of the passenger area in the side view of the vehicle.

15. The vehicle according to claim 13, wherein
the opening frame portion comprises
- a first vertical portion located on a front side of the opening of the passenger area in the side view of the vehicle, and
- a second vertical portion located on a rear side of the opening of the passenger area in the side view of the vehicle, the first vertical portion comprises an upper portion and a lower portion, the lower portion being located further forward than the upper portion, the lower attachment portion is formed on the lower portion of the first vertical portion, and the upper attachment portion is formed on the second vertical portion.

\* \* \* \* \*